Patented July 9, 1940

2,207,063

UNITED STATES PATENT OFFICE 2,207,063

GUM INHIBITORS AND STABILIZED HYDROCARBON COMPOSITIONS CONTAINING THEM

Thomas R. Liston, Hamburg, N. Y., assignor to National Aniline and Chemical Company, Inc., New York, N. Y., a corporation of New York No Drawing. Application February 13, 1939, Serial No. 256,224

14 Claims. (Cl. 44—9)

This invention relates to a new class of chemical compounds of particular merit for inhibiting the formation of gum in hydrocarbon oils, and to compositions containing such compounds to prevent the formation of gums by gum forming constituents present in the composition.

In general a satisfactory gum inhibitor must exhibit a number of different properties. It must be sufficiently soluble in the hydrocarbon to be stabilized to permit use of the gum inhibitor in concentrations which are adequately effective. For use in fuels for internal combustion motors it must be sufficiently volatile, and effective in concentrations sufficiently small, to avoid the formation of deposits in the carburetting system, and in the course of its combustion it must form no products which would injure or corrode the interior of the engine. It must be sufficiently stable to retain its effectiveness in storage and must be sufficiently inert and sufficiently insoluble in water to avoid substantial reduction of the inhibiting effect by contact of the oil with water which may occur in storage or in transit.

The products of my invention are especially valuable for preventing the formation of gum in unstable low-boiling petroleum distillates, such as so-called cracked gasolines, which contain unsaturated, gum-forming hydrocarbons.

The novel compounds of my invention are the N-(hydroxy-aryl)- and the N-(amino-aryl)-aspartic-acid-diesters containing one or more hydroxy or amino groups or both in the aryl nucleus. Examples of compounds within the purview of my invention are the diethyl, di-isopropyl, di-isobutyl, di-secondary butyl, di-(2'-ethylhexyl), di-lauryl, di-benzyl, di-cyclohexyl, di-tetrahydrofurfuryl, and cetyl isobutyl esters of N-(para-hydroxy-phenyl) aspartic acid, and the di-isobutyl ester of N-(para-amino-phenyl) aspartic acid.

The preferred compounds of my invention are the di-alkyl esters of N-(para-hydroxy-phenyl)-aspartic acid which may be represented by the general formula:

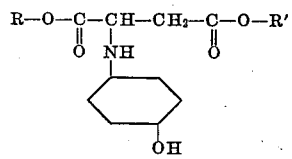

wherein R and R' represent like or unlike alkyl groups containing not more than 20 carbon atoms; especially the di-isobutyl-esters.

The preferred compounds of the invention are colorless to faintly colored, and are distinguished by their high stability, their high gum inhibiting effect, and their insolubility in water.

The compounds of the present invention may be prepared from diesters of maleic or fumaric acid by reaction of the diester at an elevated temperature with a hydroxy-aryl-amine or amino-aryl-amine, for example para-amino-phenol or para-phenylene-diamine. The reaction may be carried out in the presence of an inert high-boiling diluent with or without the addition of suitable catalysts. A highly advantageous procedure is merely to mix the two reactants in the proper proportions and heat the mixture under reflux, between 100° C. and 200° C., until the reaction is substantially complete. To avoid amidation of the ester groups, the proportion of amine should be limited to about one mol of the amine for each mol of fumaric or maleic acid diester. The diester may be present in excess or the amine may be added gradually to the diester as the reaction proceeds until at the end of the reaction approximately equimolar quantities of the reagents have been employed. The process may be conducted at atmospheric or above or below atmospheric pressure. Usually the reaction requires from about 2 to about 30 hours for its completion when conducted under the reaction conditions indicated above as preferred.

The following example illustrates the manner of preparing the compounds of the present invention. Parts are by weight.

*Example 1.*—Preparation of N-(para-hydroxyphenyl)-di-isobutyl-aspartate.

228 parts of di-isobutyl maleate are mixed with 109 parts of para-aminophenol. The mixture is heated under reflux with agitation, at a temperature between about 170° C. and about 200° C. for about 4 hours. After cooling, the reaction mass is extracted with 3700 parts of hot Varnish Makers' and Painters' Naphtha. The naphtha solution, which is separated from the insoluble residue by filtration or decantation, is cooled to about 20° C. while agitating. A white crystalline precipitate is formed, which is separated from the mother liquor by filtration. The crystalline product is soluble in alcohol, ether, and glacial acetic acid, slightly soluble in hydrocarbon solvents, and insoluble in water. Its melting point, determined after further purification by recrystallization from V. M. and P. Naphtha is between 87° C. and 88° C. The probable formula of the product is

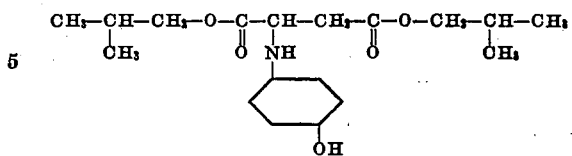

The yield is in the neighborhood of 70 per cent of the theoretical yield.

The products of the present invention may be employed as gum inhibitors for petroleum distillates in general and particularly for internal combustion motor fuels which contain appreciable amounts of unsaturated compounds. For accomplishing this purpose the gum inhibiting compound is added to the distillate in only a small amount, preferably to yield a concentration of the compound between 0.001% and 0.1% by weight of the mixture. The compounds may be added directly to the gasoline or may first be dissolved in a common solvent, for example, isobutanol or a mixture of alcohols such as methyl and isopropyl alcohols, and a suitable amount of the resultant solution may be added to the gasoline to give the desired concentration of inhibitor. The new compounds may be used effectively in the presence or absence of anti-knock compounds such as for instance, tetra-ethyl lead, benzene, etc.

An important advantage of the products of the present invention lies in their ability to provide an improved gum inhibitive effect in the presence of water. Thus it has been demonstrated that, far from injuring the gum inhibitive effect of the compound present in an unstable liquid hydrocarbon mixture subsequent washing of the said mixture actually improves the inhibitive effect. Moreover, a similar improvement is obtained if the unstable hydrocarbon mixture is first washed with water and the inhibitor is then added.

The following example illustrates the application of the compounds of the present invention as gum inhibitors.

*Example 2.*—Application of N-(para-hydroxyphenyl)-di-isobutyl-aspartate.

0.1 gram of N-(p-hydroxy-phenyl)-di-isobutyl-aspartate, prepared according to Example 1, was dissolved in 100 cc. of isobutanol. 5 cc. of the resulting solution were added to 200 cc. of an unstable hydrocarbon mixture comprising 25 per cent cyclo-hexene and 75 per cent naphtha which was free from unsaturated hydrocarbons (boiling range: 90° C. to 150° C.).

A portion of the resulting solution was washed with water. Samples of the unstable hydrocarbon mixture alone, of the hydrocarbon mixture containing N-(p-hydroxy-phenyl)-di-isobutyl-aspartate, and of the same mixture after washing with water, were subjected to the official S. A. E. oxygen bomb test. (Hunn, Fischer, Blackwood, 26, "J. Soc. Automotive Eng.," No. 1, pages 32–33 (1930).) The results were as follows:

| | Induction period, minutes |
|---|---|
| 1. Unstable hydrocarbon mixture | 180 |
| 2. The same, but stabilized by addition of gum inhibitor; concentration=244 mg. per 100 cc | 570 |
| 3. Sample 2, after washing with water | 1080 |

The additional compounds listed in the following table were prepared by a procedure similar to that of Example 1. The di-lauryl ester was derived from commercial lauryl alcohol. The effectiveness of the compounds as gum inhibitors was determined by the method of Example 2, using the same unstable hydrocarbon mixture as the testing medium. The table shows the induction period of the stabilized compositions before and after washing with water.

| Gum inhibitor | Induction period | |
|---|---|---|
| | Before water-washing | After water-washing |
| | *Minutes* | *Minutes* |
| N-(p-hydroxy-phenyl) di-ethyl aspartate | 300 | |
| N-(p-hydroxy-phenyl) di-isopropyl aspartate | | 420 |
| N-(p-hydroxy-phenyl) di-secondary butyl aspartate | | 330 |
| N-(p-hydroxy-phenyl) di-(2'-ethyl-hexyl) aspartate | 390 | |
| N-(p-hydroxy-phenyl) di-lauryl aspartate [1] | 390 | 750 |
| N-(p-hydroxy-phenyl) cetyl isobutyl aspartate | 300 | 540 |
| N-(p-hydroxy-phenyl) di-benzyl aspartate | 480 | 750 |
| N-(p-hydroxy-phenyl) di-cyclohexyl aspartate | 540 | 660 |
| N-(p-hydroxy-phenyl) di-tetrahydrofurfuryl aspartate | 705 | 840 |
| N-(p-amino-phenyl) di-isobutyl aspartate [2] | 330 | |

[1] The di-lauryl ester was a mixed ester comprising homologous alcohol residues of from eight to sixteen carbon atoms.
[2] N1-(p-amino-phenyl) di-isobutyl aspartate was found to be somewhat inferior to the para-hydroxy compounds in that the former was oxidized rather readily to a highly colored product which discolored the hydrocarbon mixture in which it was contained, whereas the para-hydroxy compounds were entirely free from this objection.

I claim:

1. As a new compound a member of the group consisting of N-(hydroxy-aryl)- and N-(amino-aryl)-aspartic acid diesters.

2. As a new compound an N-(para-hydroxyphenyl)-aspartate of the following general formula:

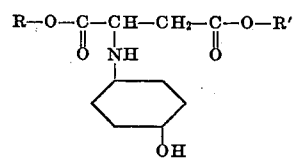

wherein R and R' each represent an alkyl group containing not more than twenty carbon atoms.

3. As a new compound N-(para-hydroxyphenyl)-di-isobutyl-aspartate having the general formula:

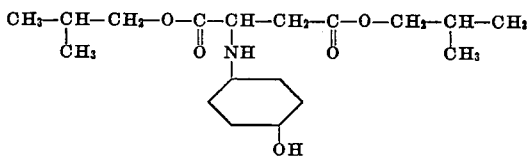

4. A gum inhibitor for inhibiting gum formation in hydrocarbons comprising a compound of the group consisting of N-(hydroxy-aryl)- and N-(amino-aryl)-aspartic acid diesters.

5. A gum inhibitor for inhibiting gum formation in hydrocarbon oils, comprising an N-(para-hydroxy-phenyl)-aspartate having the following general formula:

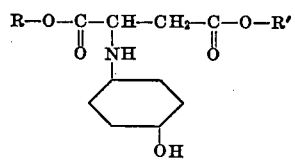

wherein R and R' each represent an alkyl group containing not more than twenty carbon atoms.

6. A gum inhibitor for inhibiting gum formation in hydrocarbon oils, comprising N-(para-hydroxy-phenyl) di-isobutyl-aspartate.

7. A composition of matter comprising a hydrocarbon oil, containing gum-forming constitutuents, in admixture with a small proportion of a gum inhibitor of the group consisting of N-(hydroxy-aryl)- and N-(amino-aryl)-aspartic-acid-diesters.

8. A composition of matter comprising a hydrocarbon distillate, containing unsaturated gum-forming constituents, in admixture with a small proportion of a gum inhibitor of the following general formula:

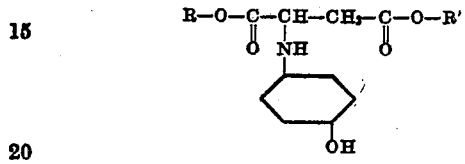

wherein R and R' each represent an alkyl group containing not more than twenty carbon atoms.

9. A composition of matter comprising a low-boiling hydrocarbon distillate motor fuel containing unsaturated gum-forming constituents and a small proportion of a gum inhibitor comprising N-(para - hydroxy - phenyl)-di-isobutyl-aspartate.

10. The method of inhibiting the formation of gum in hydrocarbons, which comprises mixing therewith water and a compound of the group consisting of N-(hydroxy-aryl)- and N-(amino-aryl)-aspartic-acid-diesters.

11. The method of inhibiting the formation of gum in hydrocarbon distillates containing unsaturated gum-forming constituents, which comprises admixing therewith water and a small proportion of a gum inhibitor having the following general formula:

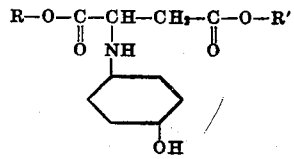

wherein R and R' each represent an alkyl group containing not more than twenty carbon atoms.

12. The method of inhibiting the formation of gum in a low-boiling hydrocarbon distillate motor fuel containing unsaturated constituents, which comprises mixing therewith water and a small proportion of a gum inhibitor comprising N-(para-hydroxy-phenyl)-di-isobutyl-aspartate.

13. The method of inhibiting the formation of gum in a low-boiling hydrocarbon distillate motor fuel containing unsaturated gum-forming constituents, which comprises mixing therewith a small proportion of a gum inhibitor comprising N-(para-hydroxy-phenyl)-di-isobutyl-aspartate, and washing the mixture with water.

14. The method of inhibiting the formation of gum in a low-boiling hydrocarbon distillate motor fuel containing unsaturated gum-forming constituents, which comprises mixing therewith a small proportion of a gum inhibitor comprising N-(para-hydroxy-phenyl)-di-isobutyl-aspartate in alcohol solution.

THOMAS R. LISTON.